United States Patent [19]
Leung

[11] Patent Number: 5,621,718
[45] Date of Patent: Apr. 15, 1997

[54] COMPACT DISC PLAYING MECHANISM HAVING FIRST AND SECOND OPERATING POSITIONS

[75] Inventor: Wilson W. S. Leung, Hong Kong, Hong Kong

[73] Assignee: Alco Electronics, Ltd., Quarry Bay, Hong Kong

[21] Appl. No.: 372,135

[22] Filed: Jan. 13, 1995

[30] Foreign Application Priority Data

Oct. 7, 1994 [GB] United Kingdom ............... 9420227

[51] Int. Cl.⁶ ........................... G11B 17/30; G11B 23/00
[52] U.S. Cl. ........................................... 369/258; 369/230
[58] Field of Search ................. 369/36–39, 75.1–75.2, 369/77.1, 244, 258, 178, 192, 230; 360/92

[56] References Cited

U.S. PATENT DOCUMENTS

| | | | |
|---|---|---|---|
| 5,124,973 | 6/1992 | Igata | 369/244 |
| 5,172,361 | 12/1992 | Urushibata et al. | 369/77.1 |
| 5,197,057 | 3/1993 | Iyama et al. | 369/37 |
| 5,473,585 | 12/1995 | Kim | 369/36 |

*Primary Examiner*—John H. Wolff
*Assistant Examiner*—George J. Letscher
*Attorney, Agent, or Firm*—Leydig, Voit & Mayer

[57] ABSTRACT

A compact disc playing mechanism includes a body with respect to which at least first and second horizontal positions are provided for placing therein compact discs, a pick-up mechanism for playing the compact discs, and a unitary moving mechanism adapted to move the pick-up mechanism from the first to the second position and to, at each of the positions, move the pick-up mechanism upwards for operation and downwards for transit. The pick-up mechanism has an engagement part. A track, which is disposed on a rotatable drum, is provided along which the engagement part slidably engages such that relative movement between the engagement part and the track causes the said upward and downward movement of the pick-up mechanism.

10 Claims, 11 Drawing Sheets

COMPACT DISC PLAYING MECHANISM HAVING FIRST AND SECOND OPERATING POSITIONS

TECHNICAL FIELD OF THE INVENTION

The present invention relates to a compact disc playing mechanism which is designed to play more than one compact disc.

SUMMARY OF THE INVENTION

According to the invention, there is provided a compact disc playing mechanism which comprises a body with respect to which at least first and second horizontal positions are provided for placing therein compact discs, a pick-up mechanism having a motor-driven spinning support for supporting thereon and spinning a compact disc and a motor-driven laser pick-up device for reading data recorded on a said spinning compact disc, and a unitary moving mechanism adapted to move the pick-up mechanism from the first to the second position and to, at each of the positions, move the pick-up mechanism upwards for operation and downwards for transit.

In a preferred embodiment, the moving mechanism is adapted to move the pick-up mechanism along a substantially linear path from the first to the second position.

Preferably, the moving mechanism is adapted to move the pick-up mechanism back-and-forth between the first and the second positions.

Advantageously, the moving mechanism is adapted to pivot the pick-up mechanism upwards and downwards at each of the positions.

In a specific construction, the pick-up mechanism has an engagement part, and a track is provided along which the engagement part slidably engages such that relative movement between the engagement part and the track causes upward and downward movement of the pick-up mechanism.

Preferably, the track is arranged to be moved by the moving mechanism relative to the engagement part in order to causes the upward and downward movement of the pick-up mechanism.

In a preferred embodiment, the moving mechanism comprises an angularly movable member which defines the track.

More preferably, the movable member is rotatable.

It is preferred that the movable member is arranged to roll along a stationary track.

Preferably, the stationary track is substantially straight.

Preferably, the movable member is arranged to disengage from the stationary track when the pick-up mechanism is moved to each of the said positions.

In a preferred arrangement, the moving mechanism is movable with the pick-up mechanism from the first to the second position.

Advantageously, the body is provided with engagement means for positively engaging the pick-up mechanism at each of the said positions.

The invention also provides a compact disc player incorporating the afore-described playing mechanism.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
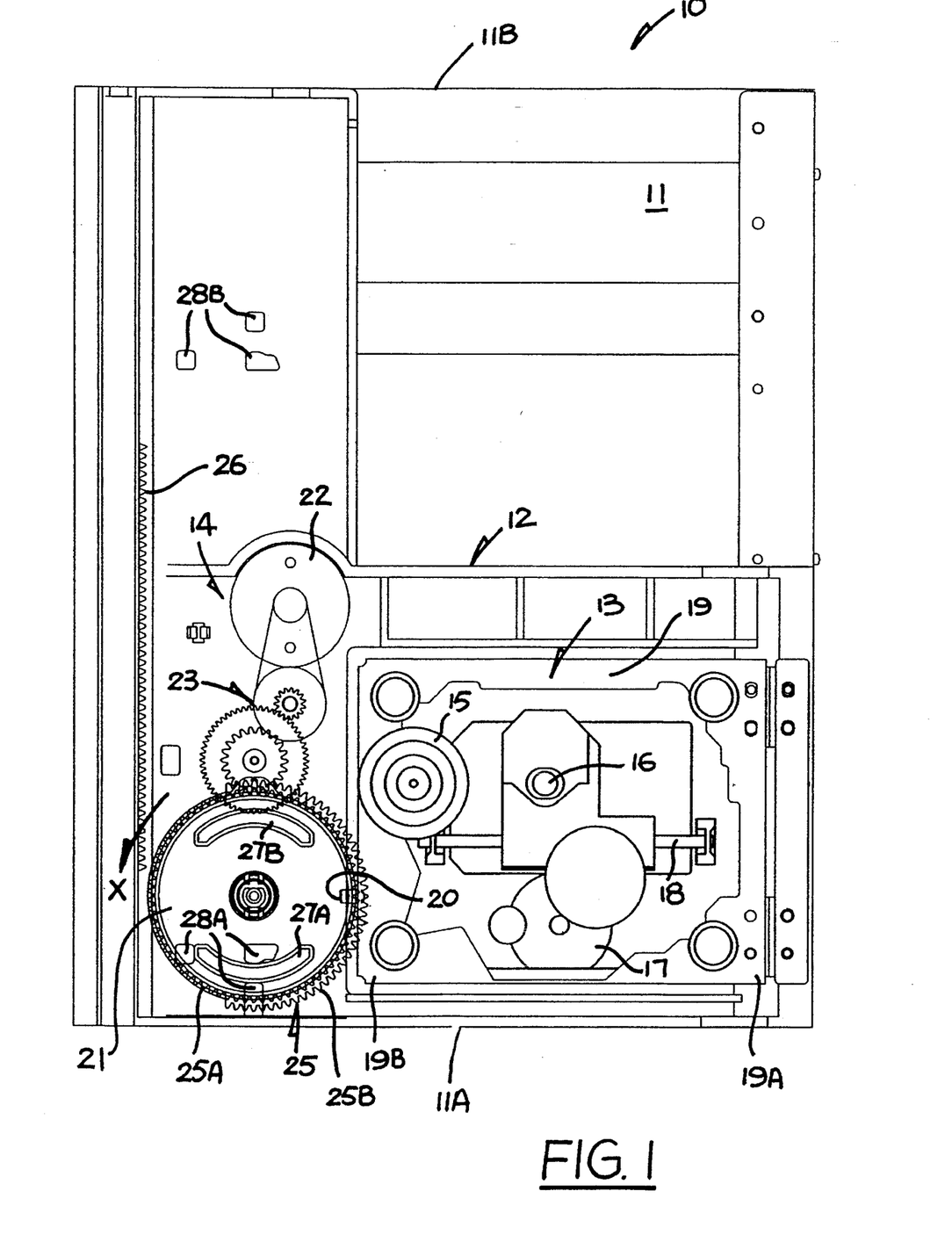
FIGS. 1 to 5 are plan views of a first embodiment of a compact disc playing mechanism in accordance with the invention, showing the playing mechanism in five sequential operating conditions.
Figure 6:
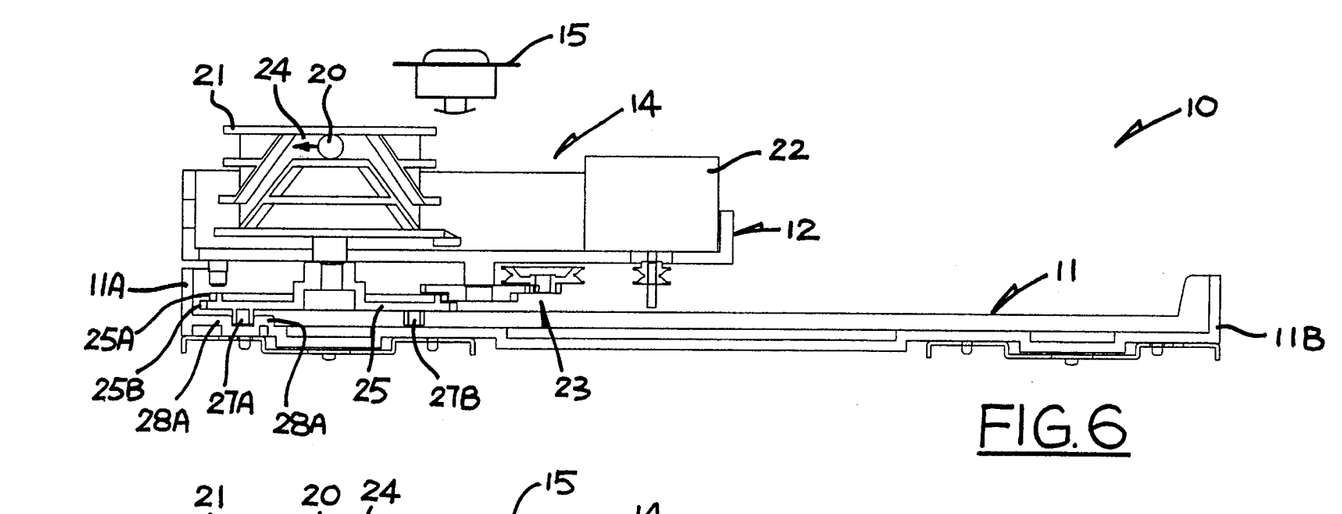
FIGS. 6 to 10 are corresponding side views of the playing mechanism of FIGS. 1 to 5.
Figure 7:
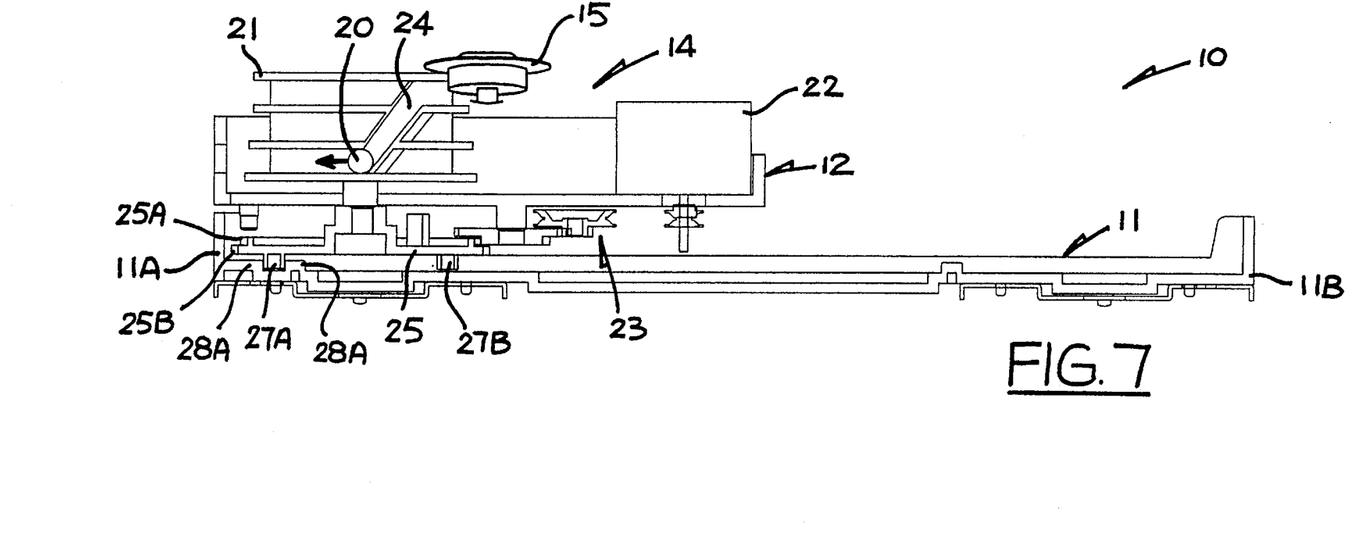
Figures 8, 9:
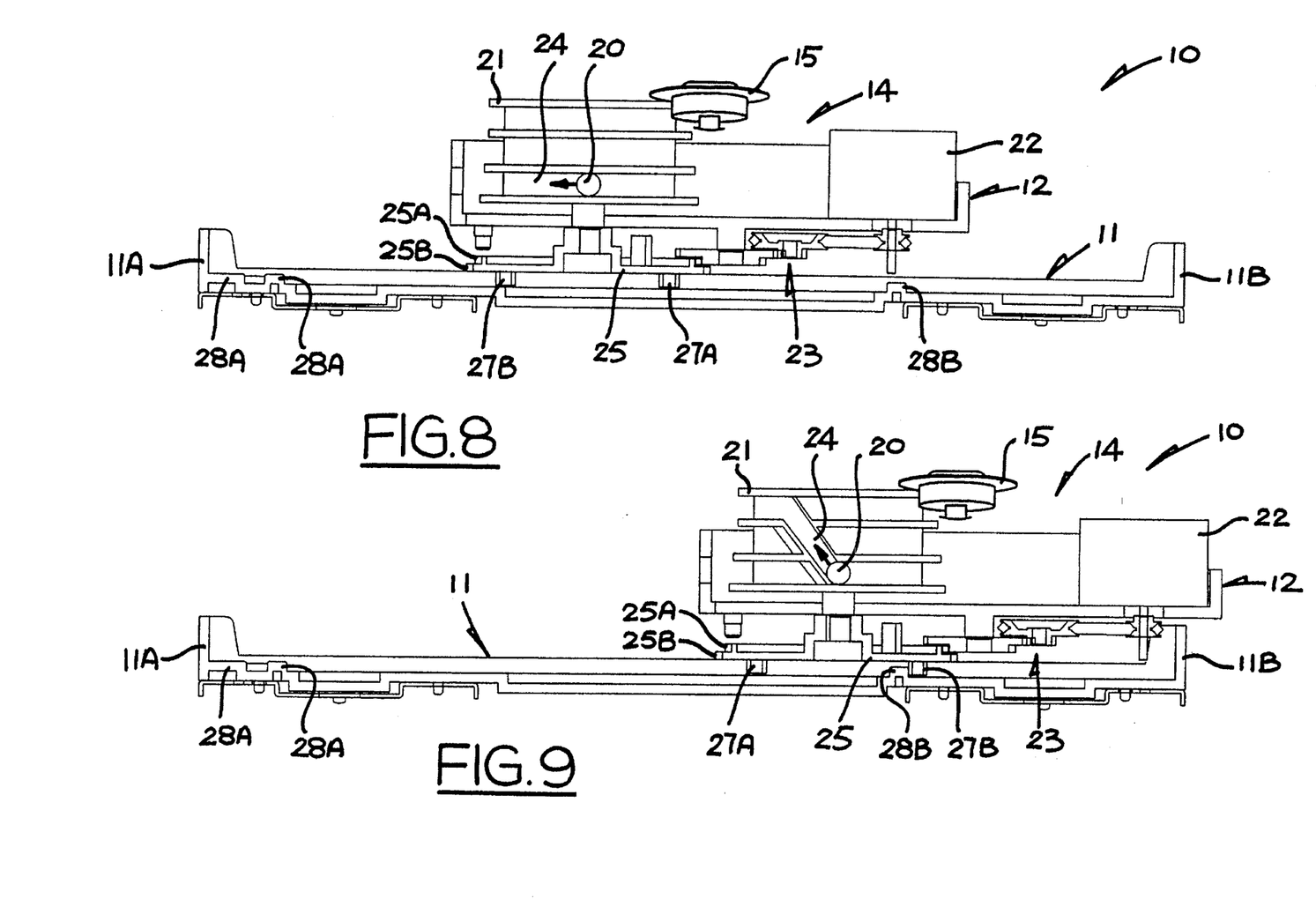
Figure 10:
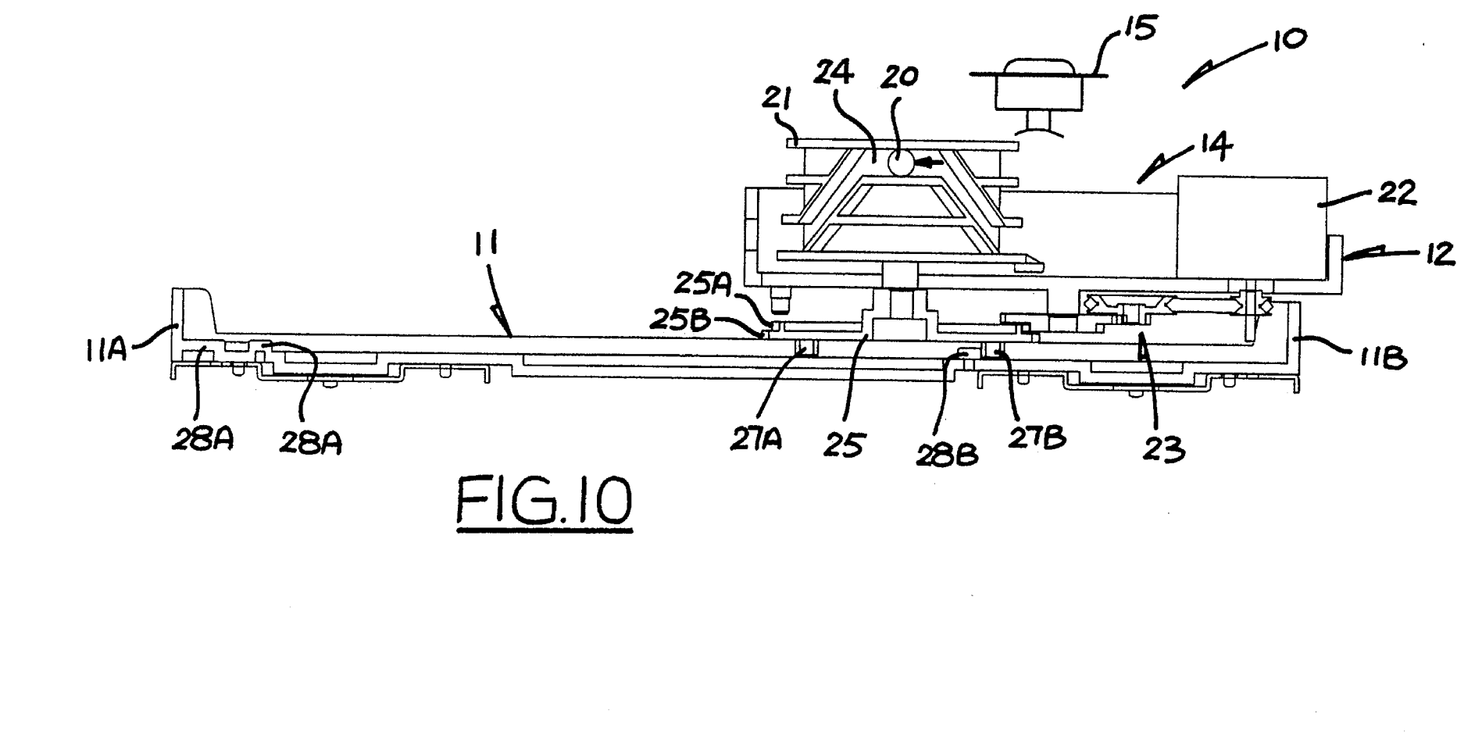
Figure 11:
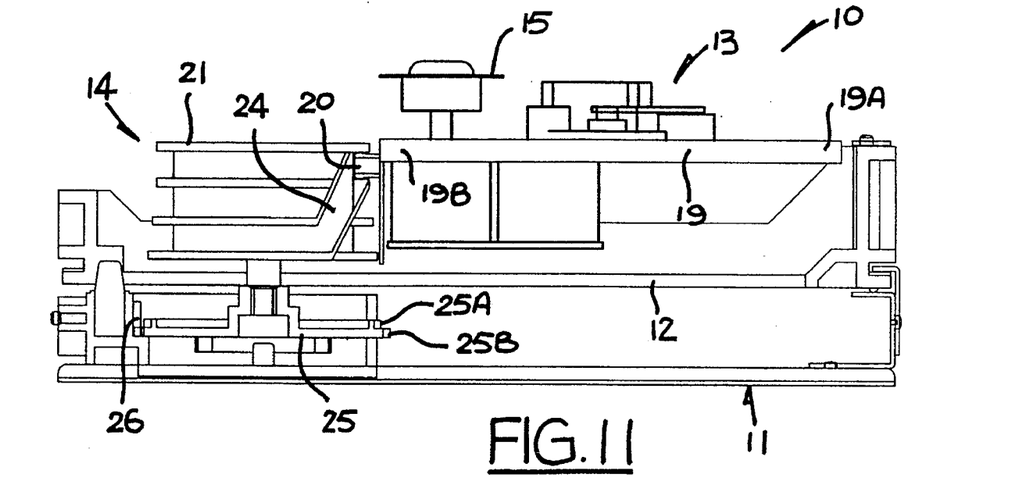
FIGS. 11 to 15 are corresponding end views of the playing mechanism of FIGS. 1 to 5.
Figure 12:
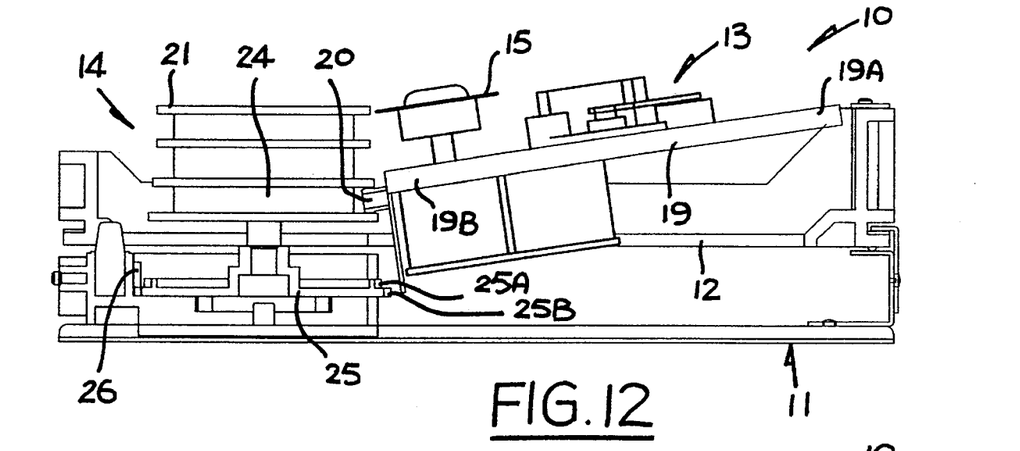
Figure 13:
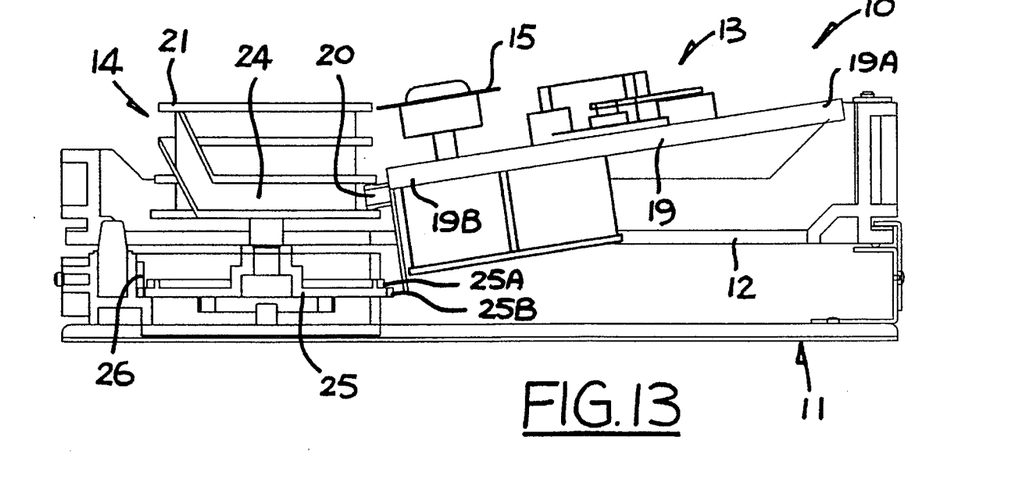
Figure 14:
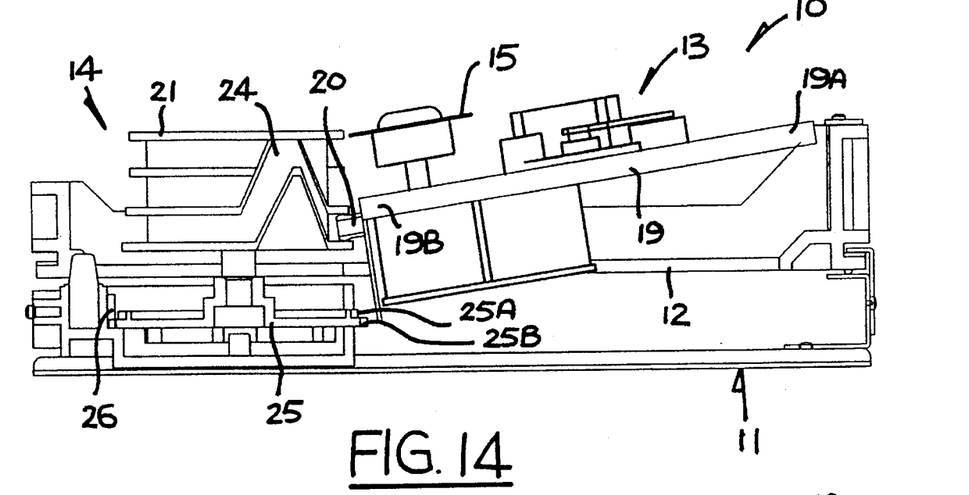
Figure 15:
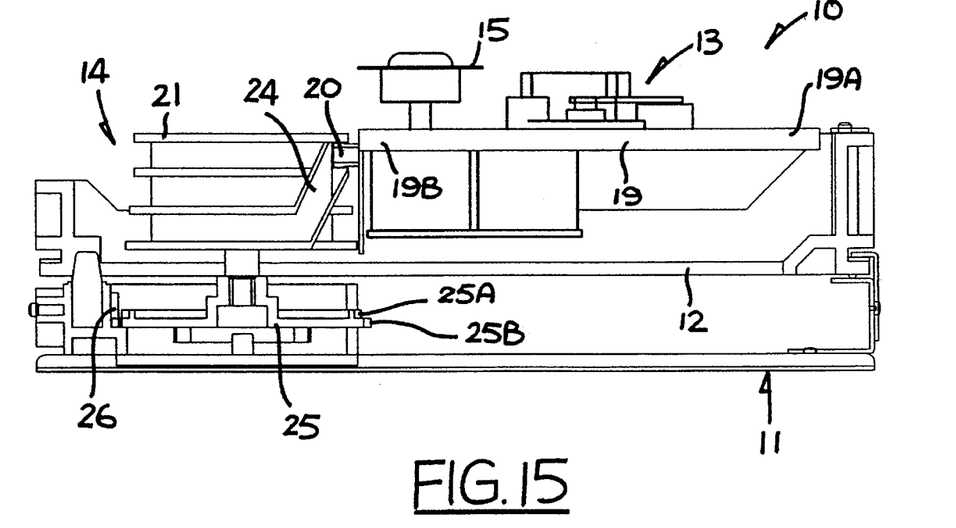

Referring firstly to FIGS. 1, 6 and 11 of the drawings, there is shown a first compact disc (CD) playing mechanism 10 embodying the invention, which playing mechanism 10 has a generally rectangular horizontal body tray 11 on which a generally rectangular platform 12 is slidable between first and second opposite ends 11A and 11B of the body tray 11, and carries thereon a pick-up mechanism 13 on one side and a moving mechanism 14 on the other side. The moving mechanism 14 is designed both to slide the platform 12 on the body tray 11 and, unitarily, to pivot the pick-up mechanism 13 relative to the platform 12.

The pick-up mechanism 13 is formed by a motor-driven spinning support 15 for engagement through a centre hole of a compact disc in order to support and spin the same at high speed, and a laser pick-up lens 16 arranged to be driven by a DC motor 17 to slide gradually along a straight track 18 extending radially with respect to the spinning support 15 in order to read data recorded on a spinning compact disc. All these components are mounted on a generally rectangular body plate 19. The body plate 19 is hinged, at one end 19A, along one side of the platform 12 such that the whole pick-up mechanism 13 is pivotable between a horizontal position (for playing a compact disc) and a dipping position (for transit). Free end 19B of the body plate 19 has a forward protruding stud 20.

The moving mechanism 14 is formed by a rotating drum 21 and a DC motor 22, which are both mounted upright on the platform 12. A gear train 23 is provided immediately underneath the platform 12 for transmitting the rotational drive of the motor 22 to the drum 21. An endless grooved track 24 is formed in and around the cylindrical peripheral wall of the drum 21, into which track 24 the stud 20 of the pick-up mechanism 13 slidingly engages, in a radial direction with respect to the drum 21.

Figure 5:
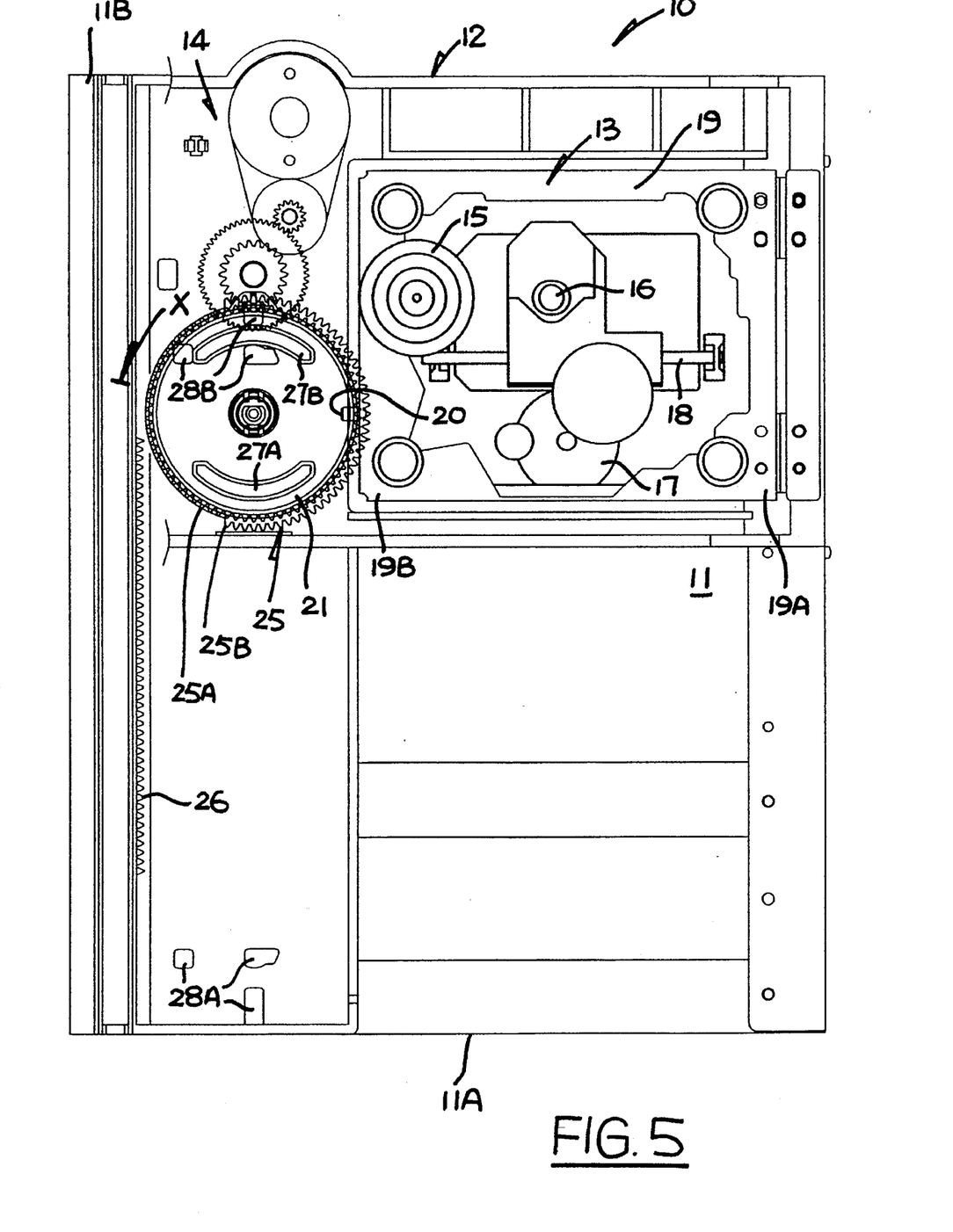

The drum 21 has a co-axial bottom gearwheel 25 which has upper and lower levels 25A and 25B of peripheral teeth. The upper teeth 25A extend all around the gearwheel 25, and are in mesh with the gear train 23. The lower teeth 25B extend over only about 240° around the gearwheel 25, and are staggered radially outwards with respect to the upper teeth 25A. A stationary toothed rack 26 is fitted along the side of the body tray 11 adjacent the moving mechanism 14, having a length about the same as the arcuate length of the lower teeth 25B. The rack 26 is arranged for the gearwheel 25 to gearingly engage with such that, upon rotation by the motor 22, the gearwheel 25 rolls therealong, carrying the drum 21 through the same rolling motion. Upon rolling of the gearwheel 25 along the rack 26, the platform 12, including the pick-up mechanism 13, is moved linearly from one end 11A/11B to the other end 11B/11A of the body tray 11. When the platform 12 reaches either body tray end 11A/11B, the gearwheel 25 disengages from the corresponding end of the rack 26 through the absence of its own teeth 25B, thereby defining a first position A for the platform 12 at the first body tray end 11A (FIG. 1) and a second position B at the second body tray end 11B (FIG. 5).

The bottom side of the gearwheel 25 has a pair of diametrically opposite arcuate ribs 27A and 27B, each of which extends over about 90°. A first group of three upstanding protrusions 28A is formed on the body tray 11, at its first end 11A. The protrusions 28A are provided at the same level as the gearwheel bottom ribs 27A and 27B, and define a parking space for the rib 27A. Parking of the bottom rib 27A into the parking space defined by the protrusions 28A positively determines position A of the platform 12. Another group of three upstanding protrusions 28B is also formed on the body tray 11, adjacent its second end 11B, which correspondingly defines a parking space for the other bottom rib 27B. Likewise, parking of the bottom rib 27B into this second parking space positively determines position B of the platform 12.

The movement of the platform 12 will now be described with reference to FIGS. 1 to 5 of the drawings, which illustrate how the platform 12 moves from position A to position B, during which the drum 21 is rotated by the motor 22 in an counter-clockwise direction as indicated by an arrow X. This movement consists of three sequential intervals, namely interval I (before the gearwheel 25 engages with the rack 26), interval II (while the gearwheel 25 is engaging with the rack 26) and interval III (after the gearwheel 25 has disengaged from the rack 26).

Figure 2:
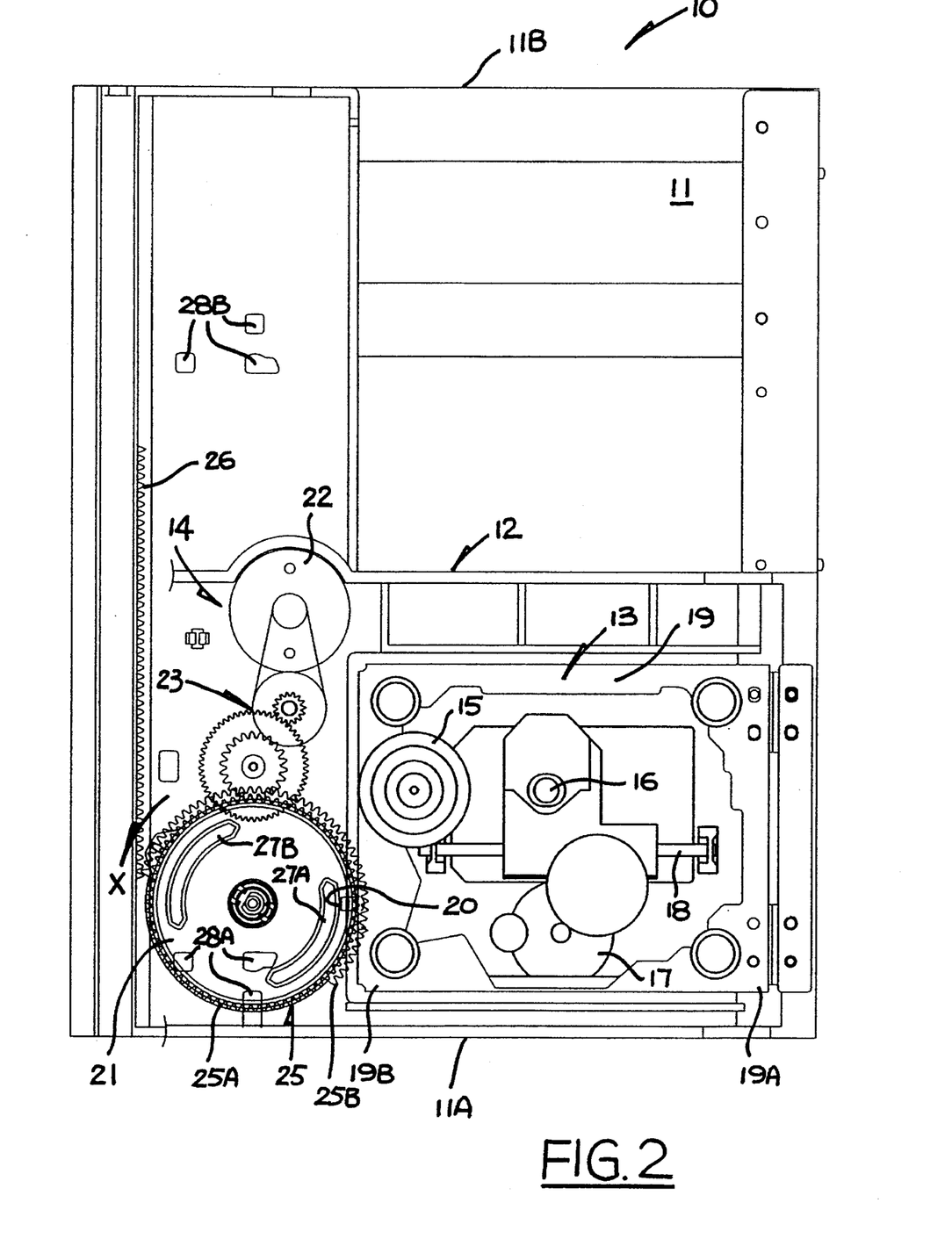

Movement interval I is illustrated from FIGS. 1 to 2, during which the bottom rib 27A of the gearwheel 25 moves angularly out of the packing space defined by the protrusions 28A, and the bottom teeth 25B of the gearwheel 25 move angularly into engagement with the rack 26. Before the gearwheel 25 engages with the rack 26, the platform 12 remains stationary in position A. The gearwheel 25 (and hence the drum 21) simply rotates through an angle of 60°.

Figure 3:
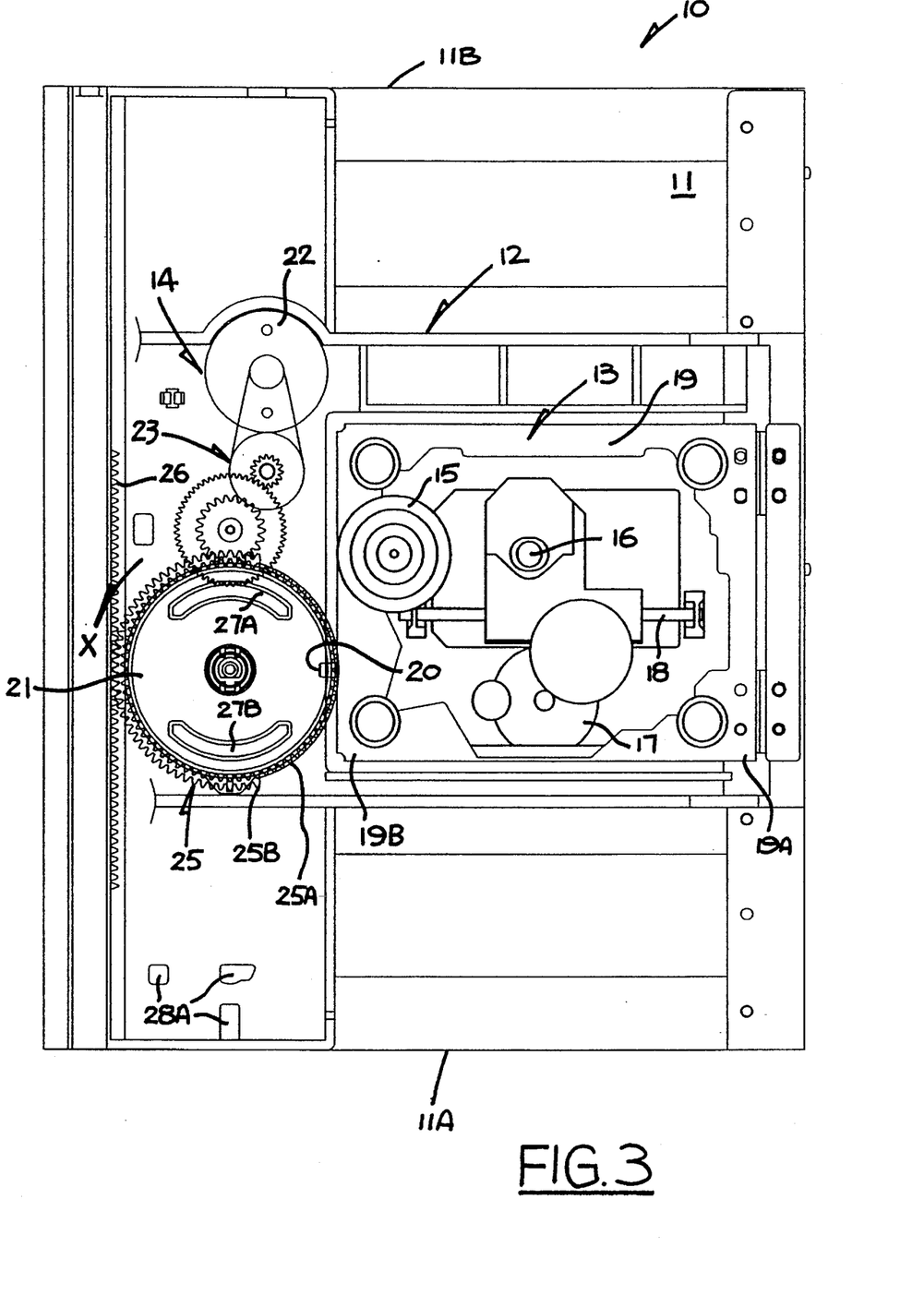
Figure 4:
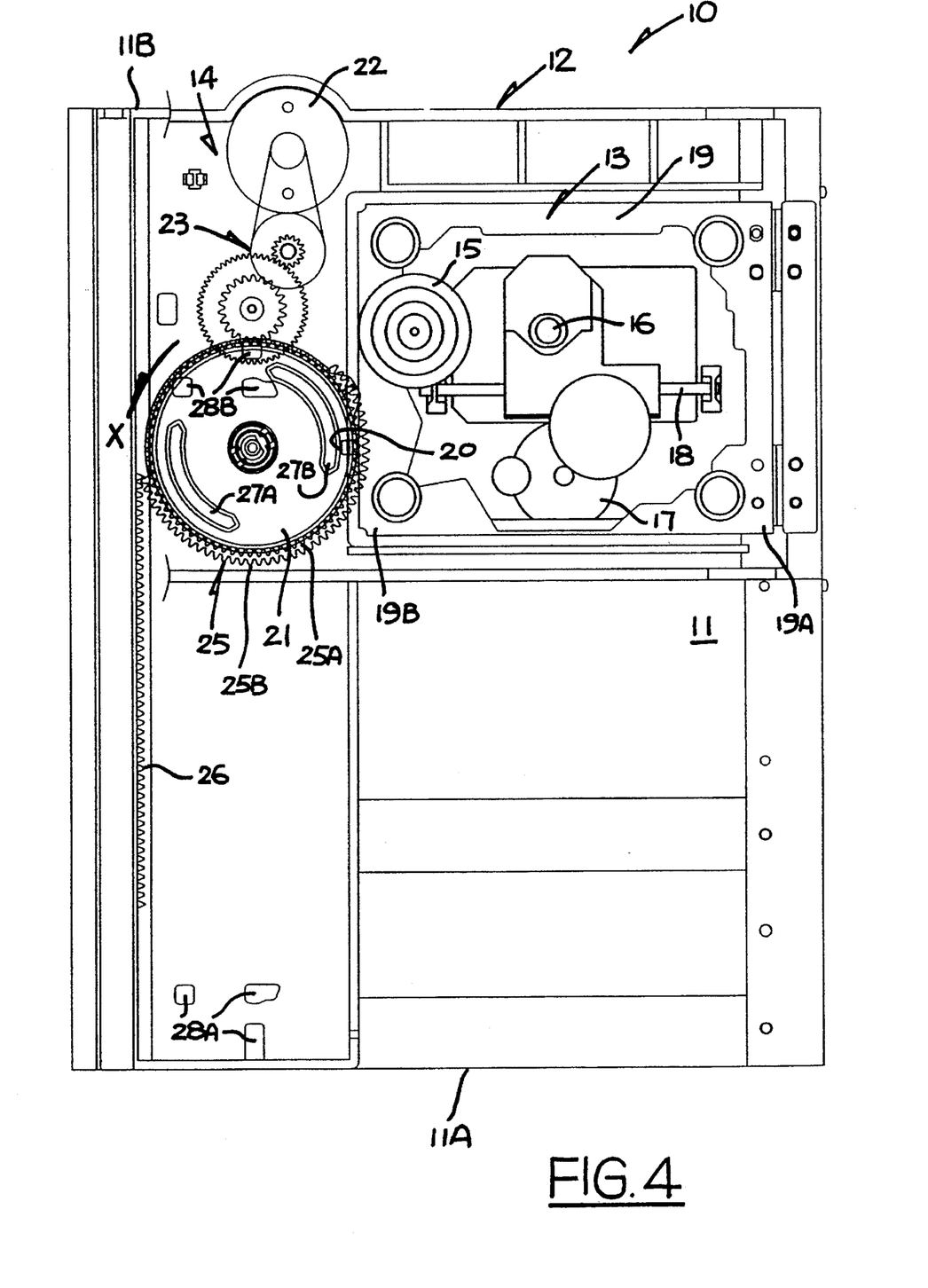

Movement interval II is illustrated from FIGS. 2 to 4, during which the gearwheel 25 is gearingly engaging with the rack 26 and thus rolls therealong. The gearwheel 25 rotates through an angle of 240°, and so does the drum 21. The platform 12 is slid from position A to position B.

Movement interval III is illustrated from FIGS. 4 to 5, during which the bottom rib 27B of the gearwheel 25 moves angularly into the parking space defined by the protrusions 28B, and the bottom teeth 25B of the gearwheel 25 move angularly out of engagement with the rack 26. As the gearwheel 25 does no longer engage with the rack 26, the platform 12 remains stationary in position B. The gearwheel 25 (and hence the drum 21) simply rotates through an angle of 60°.

FIGS. 6 to 10 and FIGS. 11 to 15 of the drawings correspond to FIGS. 1 to 5, which illustrate not only the linear movement of the platform 12 but also the action of the rotating drum 21 upon the pick-up mechanism 13.

Figure 16:
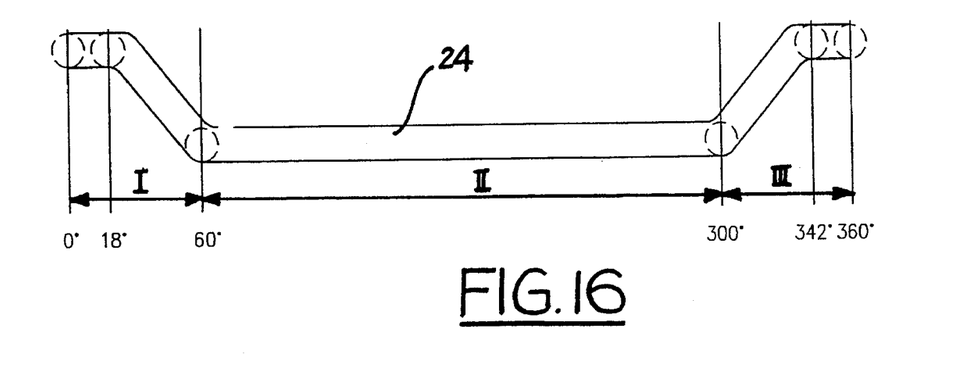
FIG. 16 is a development view of a track incorporated in the playing mechanism of FIGS. 1 to 15.

Referring also to FIG. 16 of the drawings, the grooved track 24 on the drum 21 has a developed profile, as shown, which may be divided into three sequential sections I, II and III corresponding to the movement intervals I, II and III of the platform 12. The track sections are identified by reference to the angle of rotation of the drum 21. Section I covers the range from 0° to 60°, in which the track 24 extends for the initial 18° horizontally at an upper level and then slopes down to a lower level. Section II covers the range from 60° to 300°, in which the track 24 extends horizontally throughout at the lower level.

Section III covers the range from 300° to 360°, in which the track 24 slopes up back to the upper level and extends for the last 18° horizontally at the upper level.

Bearing in mind that the stud 20 of the pick-up mechanism 13 is in continuous engagement within the grooved track 24 of the drum 21, rotation of the drum 21 will pivot the whole pick-up mechanism 13 between its horizontal and dipping positions. Over interval/section I, the pick-up mechanism 13 is pivoted down from its horizontal position to its dipping position while the platform 12 stays in position A. Over interval/section II, the pick-up mechanism 13 remains in its dipping position while the platform 12 travels from position A to position B. Over interval/section III, the pick-up mechanism 13 is pivoted up from its dipping position back to its horizontal position while the platform 12 stays in position B.

The platform 12 is slidable from position B back to position A through a sequence of actions in direct reverse order to the sequential actions described above, with the gearwheel 25 (and hence the drum 21) rotated by the motor 22 in the opposite, clockwise direction. The reversal applies to the simultaneous pivotal movement of the pick-up mechanism 13.

In the actual use of the CD playing mechanism 10, the positions A and B of the platform 12 define two adjacent positions for two compact discs to be placed side-by-side. These two CD positions may be provided by a supporting plate located atop the whole playing mechanism 10, which has two apertures for exposing the spinning support 15 of the pick-up mechanism 13 when the platform 12 and hence the pick-up mechanism 13 is in either position A or position B. Accordingly, two compact discs may be placed on the playing mechanism 10 side-by-side for playing, for example one after the other.

Figure 17:
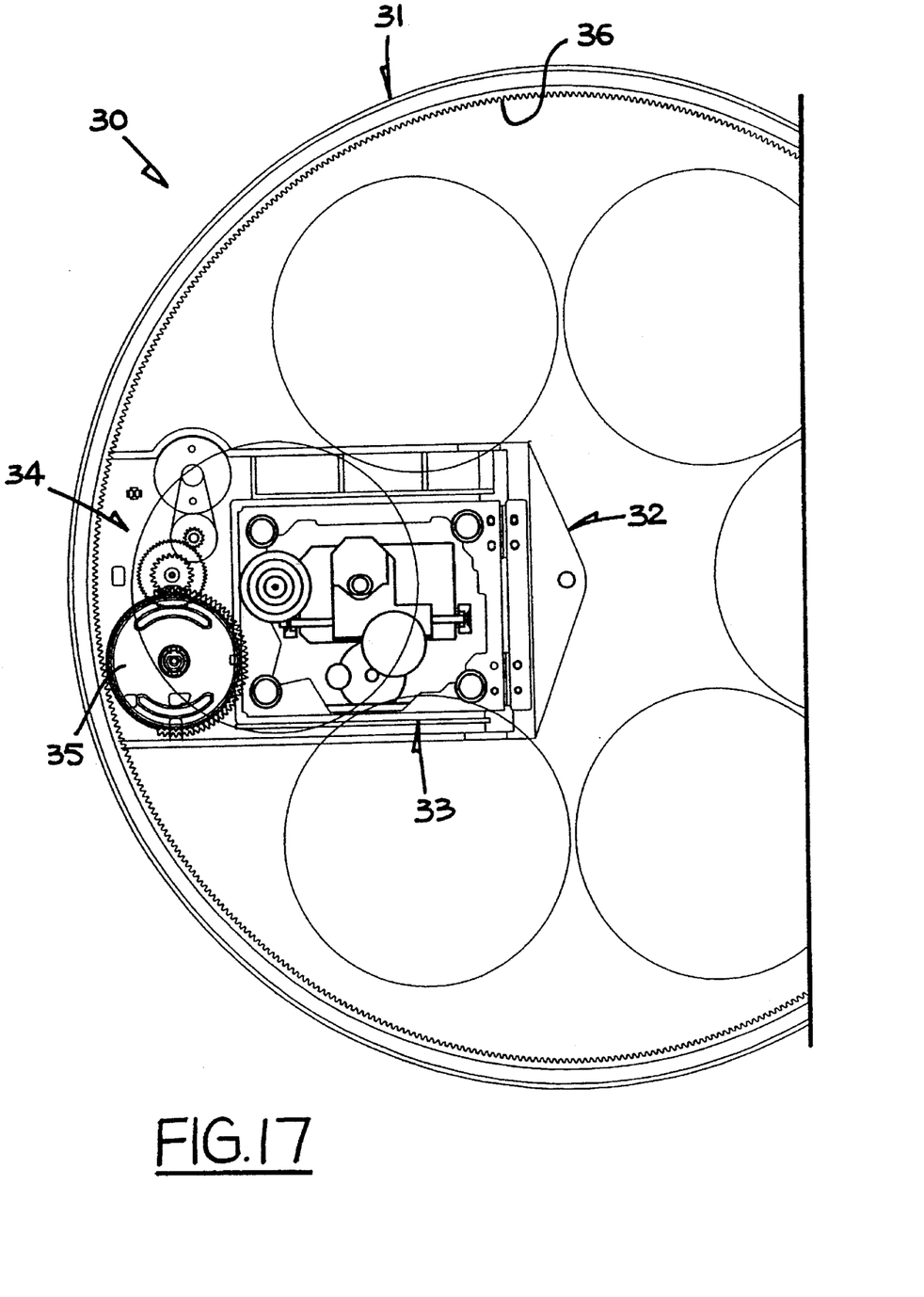
FIG. 17 is a plan view of a second embodiment of a compact disc playing mechanism in accordance with the invention.

Reference is finally made to FIG. 17 of the drawings, there is shown a second CD playing mechanism 30 embodying the invention, which playing mechanism 30 is circular when viewed from above and is designed to hold six compact discs side-by-side in a circular arrangement. The playing mechanism 30 has a circular body tray 31, around the internal periphery of which an annular toothed rack 36 (equivalent to the aforesaid rack 26) is provided. The playing mechanism 30 further includes a platform 32 (equivalent to the aforesaid platform 12) supporting thereon a pick-up mechanism 33 (equivalent to the aforesaid pick-up mechanism 13) and a moving mechanism 34 (equivalent to the aforesaid moving mechanism 14). The platform 32 is hinged about the vertical axis of the circular body tray 31, with the pick-up mechanism 33 on the radial inner side and the moving mechanism 34 on the radial outer side. The moving mechanism 34 includes a rotating drum 35 (equivalent to the aforesaid drum 21) which is in gearing engagement with the circular rack 36 via a co-axial bottom gearwheel (equivalent to the aforesaid gearwheel 25).

The operation of this playing mechanism 30 is essentially the same as that of the aforesaid playing mechanism 10, except that the present platform 32 and hence the pick-up mechanism 33 is now turned by the moving mechanism 34 to travel angularly (instead of linearly) from one CD position to the next CD position, with the pick-up mechanism 33 pivoted down for transit.

It is appreciated that the first playing mechanism 10 may be modified to play more than two compact discs placed one after another in a linear arrangement, with the pick-up mechanism 13 slidable stepwise by the moving mechanism 14 from one CD position to the next CD position in either direction.

The invention has been given by way of example only, and various other modifications of and/or alterations to the described embodiments may be made by persons skilled in the art without departing from the scope of the invention as specified in the appended claims.

What is claimed is:

1. A compact disc playing mechanism comprising:

a body tray;

a platform engaged with said body tray;

a body plate having first and second ends, the first end being pivotally connected to said platform, and the second end including an engagement part which moves during transport through at least first and second horizontal positions;

a pick-up mechanism disposed on said body plate, said pick-up mechanism having a motor-driven spinning support for supporting and spinning a compact disc and a motor-driven laser pick-up device for reading data recorded on the spinning compact disc; and a unitary moving mechanism adapted to move the pick-up mechanism from the first to the second position and to, at each of the first and second positions, pivot the pick-up mechanism upwards for operation and downwards for transit, said moving mechanism being movable with the pickup mechanism from the first to the second position, said moving mechanism including a movable track along which the engagement part slidably engages such that movement of the track relative to the engagement part causes the upward and downward pivoting of said pick-up mechanism, the track being angularly movable and rotatable.

2. A compact disc playing mechanism as claimed in claim 1, wherein the moving mechanism is adapted to move the pick-up mechanism along a substantially linear path from the first to the second position.

3. A compact disc playing mechanism as claimed in claim 1, wherein the moving mechanism is adapted to move the pick-up mechanism back-and-forth between the first and the second positions.

4. A compact disc playing mechanism as claimed in claim 1, wherein the moving mechanism is adapted to pivot the pick-up mechanism upwards and downwards at each of the said positions.

5. A compact disc playing mechanism as claimed in claim 1, wherein said body tray includes a stationary track and the movable member is arranged to move while engaging with the stationary track thereby moving said pick-up mechanism.

6. A compact disc playing mechanism as claimed in claim 5, wherein the stationary track is substantially straight.

7. A compact disc playing mechanism as claimed in claim 5, wherein the movable member is arranged to disengage from the stationary track when the pick-up mechanism is moved to each of the first and second positions.

8. A compact disc playing mechanism as claimed in claim 1, wherein the body is provided with engagement means for positively engaging the pick-up mechanism at each of the first and second positions.

9. A compact disc player incoratoring a compact disc playing mechanism as claimed in claim 1.

10. A compact disc playing mechanism as claimed in claim 8, wherein said moving mechanism includes an angularly movable member which defines the movable track, and the engagement means includes a plurality of protrusions disposed on said body tray and a rib disposed on said angularly movable member and arranged to engage the protrusions in order to positively secure the pick-up mechanism at each of the first and second positions.

* * * * *